United States Patent [19]
Moskowitz

[11] Patent Number: 5,638,638
[45] Date of Patent: Jun. 17, 1997

[54] FLOWER POT WITH ACCESSIBLE WATERING BASE

[75] Inventor: Morris Moskowitz, Monsey, N.Y.

[73] Assignee: Missry Associates Inc., Dunellen, N.J.

[21] Appl. No.: 505,612

[22] Filed: Jul. 21, 1995

[51] Int. Cl.$^6$ ...................................................... A01G 9/04
[52] U.S. Cl. ............................................ 47/71; 47/73
[58] Field of Search ........................ 47/71, 81 S, 73, 47/66 N, 73 R

[56] References Cited

U.S. PATENT DOCUMENTS

| | | | |
|---|---|---|---|
| 4,170,089 | 10/1979 | Smrt | 47/71 |
| 4,173,097 | 11/1979 | Staby | 47/73 R |
| 4,962,613 | 10/1990 | Nalbandian | 47/71 |
| 5,040,330 | 8/1991 | Belgiorno | 47/73 R |
| 5,481,826 | 1/1996 | Dickinson | 47/71 |

FOREIGN PATENT DOCUMENTS

| | | | |
|---|---|---|---|
| 3346966 | 11/1977 | France | 47/71 |
| 453092 | 8/1951 | Netherlands | 47/71 |
| 2204222 | 11/1988 | United Kingdom | 47/81 S |

*Primary Examiner*—Henry E. Raduazo
*Attorney, Agent, or Firm*—Bauer & Schaffer

[57] ABSTRACT

A flower pot is provided having an upper pot section and a base reservoir section. The upper pot section is formed with an open top, a closed side wall and a slotted or perforated bottom wall. A concave depression is formed on the lower edge of the side wall and outer edge of the bottom wall tapering off upward and inward. Downwardly protruding from the slotted bottom wall of the upper pot section is a shaped footing section adapted to hold both soil and a substantial portion of the flower root system that has its own closed side walls and a bottom wall. A footing section extends down below the side wall of the base section. The downward protruding footing is perforated to allow water deposited in the base section to enter up into the roots.

8 Claims, 2 Drawing Sheets

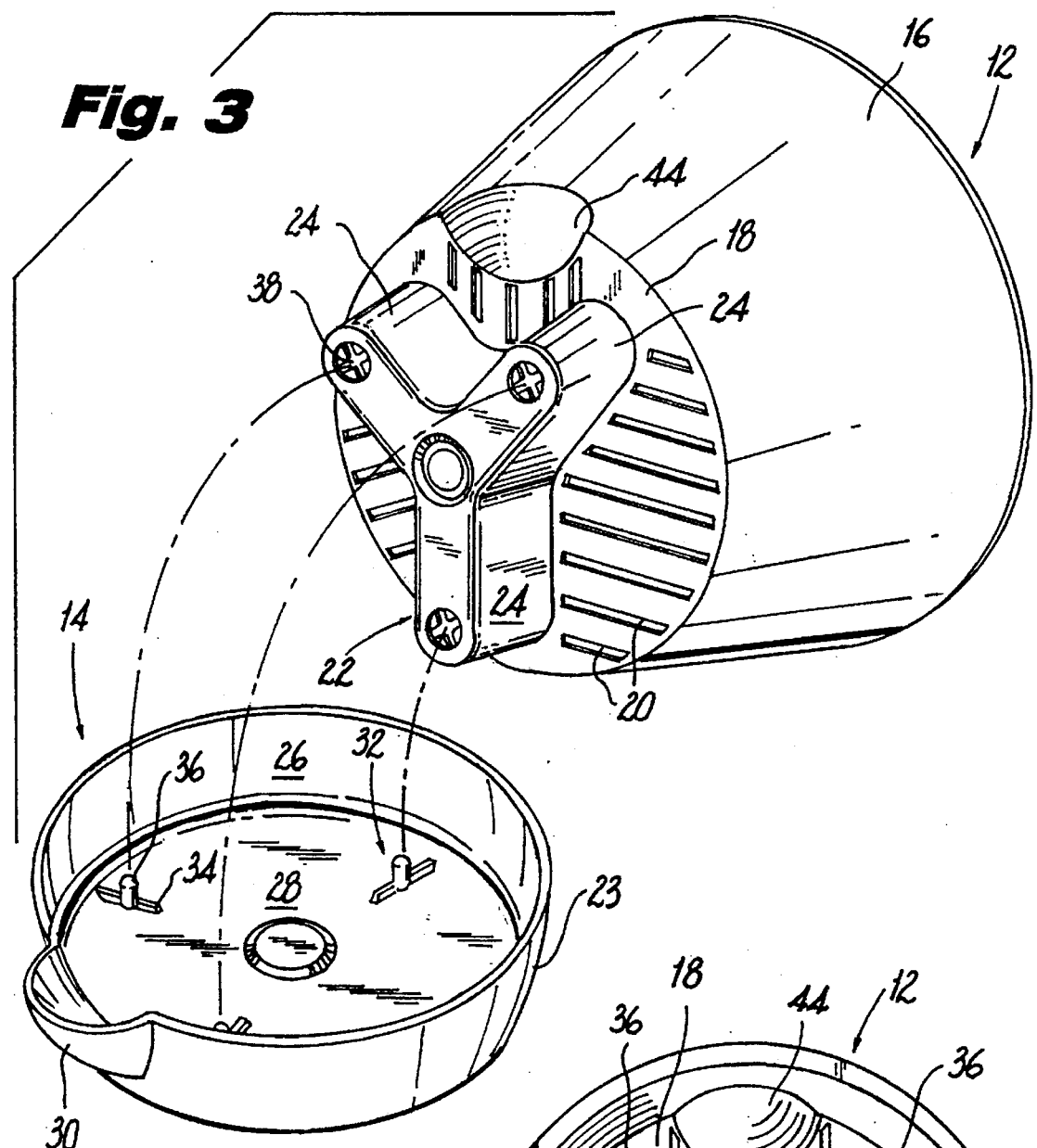
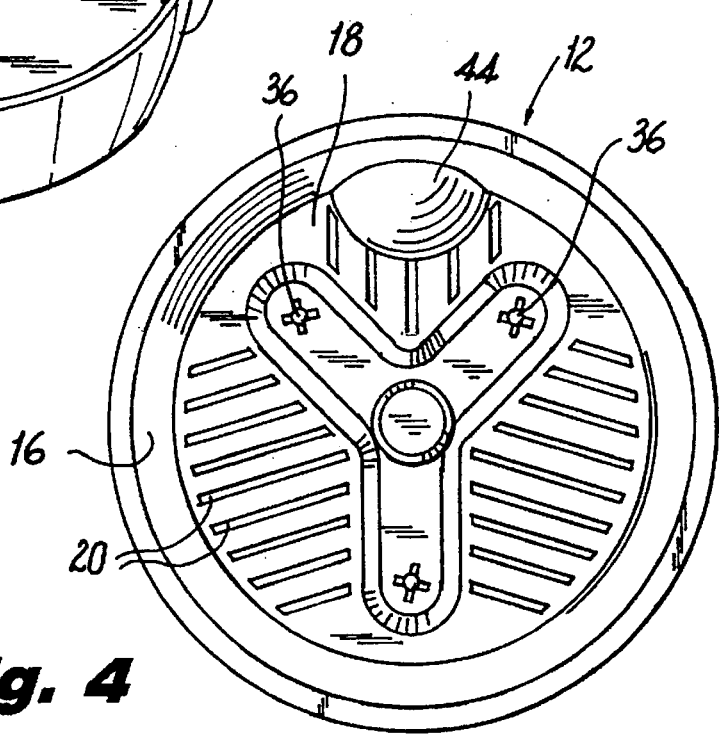

FLOWER POT WITH ACCESSIBLE WATERING BASE

BACKGROUND OF THE INVENTION

The present invention relates generally to indoor flower pots and particularly to flower pots having a base container section providing a reservoir for water.

Flower pots having a base container section are known. These have the advantage that water filling the base container section can be absorbed by the flower roots through capillary action, over an extended period of time. In general such flower pots accumulate water in this base containers by allowing the excess water fed to the soil to seep through holes in the bottom of the pot. Some pots have separable bottoms which can be filled and some have shaped pots allowing water to by-pass the soil and flow directly into the base container. In any event, such pots have the disadvantages that an insufficient amount of water accumulates in the base section to maintain the roots wet for a long period. Thus, the user must continually add water to the soil sometimes resulting in overwatering. A flower pot having an integral base contained is known, wherein the wall of the pot is provided with a recess allowing access to the base container section in order to fill the base with water. Such access is very restricted and it is difficult to pour the water therein particularly when using a watering can. Also, it is difficult to observe the water level in the base container section and frequent spilling occurs.

The longstanding but heretofore unfulfilled need for a flower pot having the desired features of access to the base container section for watering and observing the water level therein with out removing the upper container section is now fulfilled by the invention disclosed hereinafter and as follows.

SUMMARY OF THE INVENTION

According to the present invention, a flower pot is provided having an upper pot section and a base reservoir section. The upper pot section is formed with an open top, a closed side wall and a slotted or perforated bottom wall. A concave depression is formed on the lower edge of the side wall and outer edge of the bottom wall tapering off upward and inward. Downwardly protruding from the slotted bottom wall of the upper pot section is a shaped footing section adapted to hold both soil and a substantial portion of the flower root system that has its own closed side walls and a bottom wall. This footing section extends down below the side wall of the base section. The downward protruding footing is perforated to allow water deposited in the base section to enter up into the roots.

The base section has an open top, a closed side wall and a closed bottom wall defining a reservoir for water. The top side of the bottom wall of the base container section has spaced, low lying supports that allow the upper container section to be held above the surface of the bottom wall of the base section at a distance great enough to allow water to flow beneath the downward protruding footing. A protruding lip is formed in the wall of the base container. The lip, conforming in mirror-like image to the recess in the pot section, extends outwardly from the closed side wall of the base section to protrude beyond the periphery of the upper pot section like an inverted bird's beak. The upper edge of the lip is even with the upper edge of the closed side wall of the base container section, thus insuring the integrity of the reservoir formed by the base section.

When the upper container section is placed on the base container section and the protruding lip and concave recess are aligned an access port is formed that allows for easy insertion of water into the base container section and also allows for easy viewing of the water level in the base container section.

Preferably, the base section is provided with pegs that extend up from the bottom wall that mate with cooperating cross cuts on the downward protruding bottom footing of the upper pot section. The pegs and cross cuts are preferably unevenly spaced such that when the base and upper container sections are joined and the protruding lip and concave depression align in a singular manner to insure that the lip and recess are also aligned.

BRIEF DESCRIPTION OF THE DRAWINGS

For a more complete understanding of the nature and objects of the invention, reference should be made to the following detailed description, taken in connection with the accompanying drawings, in which:

FIG. 3 is an exploded view of the base container section and the upper pot section; and FIG. 4 is bottom plan view of the pot section.

Similar reference numerals refer to similar parts throughout the several views of the drawings.

DETAILED DESCRIPTION OF THE PREFERRED EMBODIMENT

Figure 1:
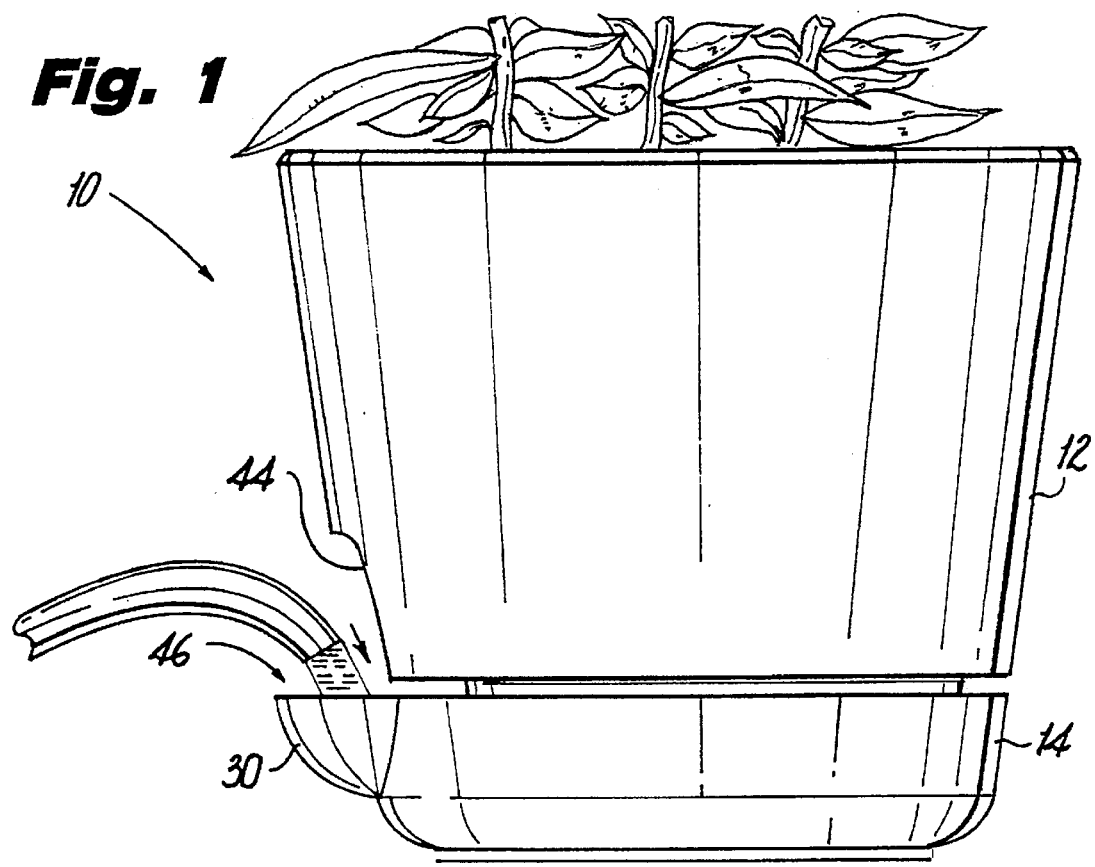
FIG. 1 is a side elevational view of the upper pot section mated with the base container section showing the spout of a watering can pouring water into the base container section.

As seen in the figures the invention is illustrated in a flower pot, designated generally by the numeral 10 having an upper pot section 12 and a base section 14.

The pot section 12 comprises a conventionally shaped truncated conical wall 16 closed at its bottom by a wall 18 formed with a plurality of slots 20. Integrally extending from the bottom wall 18 is a pedestal 22 having three legs 24 arrayed in the shape of a Y. The legs 24 of the pedestal are hollow and thereby provide an interconnected chamber connecting with the hollow pot for dirt and plant roots to grow therein.

The base section 14 comprises a circumferentially closed side wall 26 and a first bottom wall 28. The side wall 26 extends upward approximately the height of the pedestal 22 and the bottom of the pot section and is provided with a radially protruding lip 30 which extends outwardly in the shape of an inverted beak or funnel. The side wall 26 is of such a height that, as a whole, the base section 14 has the appearance of a shallow pan onto which the upper pot section 12 fits.

Figure 2:
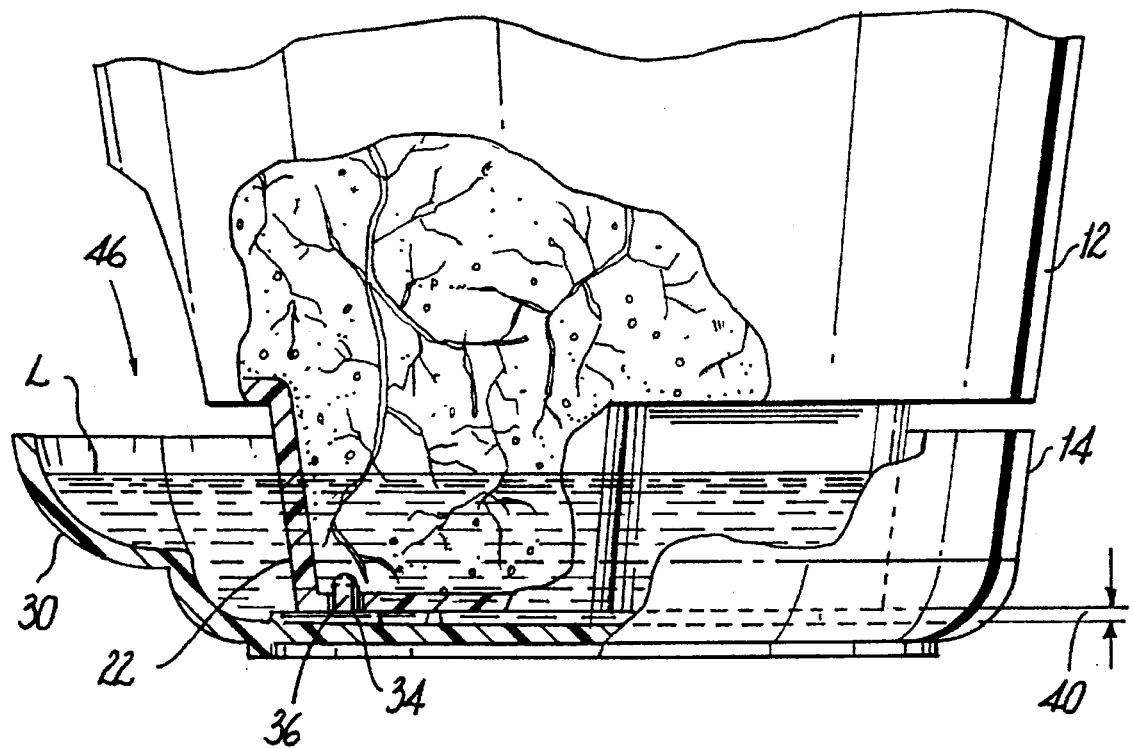
FIG. 2 is a partial view of the pot section mated with the base container section showing in part section the downward protruding footing, the water level and the roots of the plant in the upper container section.

To insure that the upper pot section 12 seats firmly and may be securely connected to the lower base section 14, the surface of the bottom wall 28 of the base section is provided with an array of supports 32 each being a linear bar 34 and peg 36. The supports 32 are unevenly spaced in a Y shaped array conforming to the array of the pedestal 22. At the same time, the bottom wall of each leg 24 is formed with crucible opening 38 at their respective ends. The crucible opening 38 has a center portion through which an associated peg 36 fits. As seen from FIG. 2, the supports 32 cause the pot section 12 to seat above the bottom of the base section 14 by a distance 40 equal to the height of the linear support bar 34. Thus, water is free to flow within a reservoir 42 formed within the base section 14 beneath the pot section 12. The crucible opening, however, is large enough to permit water to be absorbed, as by wicking, into the dirt and roots within each leg 24 of the pedestal 22.

As support, the pegs 36 and the crucible opening 38 cooperate to lock the upper pot section 12 and lower base section 14 together.

The outer wall of the upper pot section 12 is formed with a conical shaped recess 44 at that position where it will overlie the lip 30 when the upper and base sections are secured together. Thus, as seen from FIG. 1, the lip 30 and recess 44 cooperate to form a funnel 46 into which water may be easily poured to fill the reservoir 42 from any type of watering can, faucet, or nozzle, the funnel 46 being sufficiently wide and the lip extending sufficiently to accommodate any filling device. It will also be observed that the side walls of the pedestal are solid and unperforated thereby insuring that water enters the pedestal only from the crucible openings 38 in each leg. Lastly, it will also be observed that there is a small space between the bottom wall of the pot 12 and the upper edge of the side wall 26 of the base 18. This insures that the water level L is always below the slots 20 formed in the bottom wall of the pot 12.

It will be clear that water in the base section 14 will seep upward only through the crucible opening 38 to feed the roots. Thus, the amount of water in the reservoir 42 will not over soak the plant and the reservoir 42 can be kept filled to its full capacity thereby providing several days' or weeks' supply of water at one time. If by chance water is poured directly into the top of the upper pot section, all excess water will run through the soil and drop into the base section through the slots 26 in the bottom wall of the upper pot section 12. Since all the water in the reservoir 42 is free to flow as a single body, its level L is clearly visible by looking into the protruding lip 30 or the funnel formed by it with the recess 44.

The protruding lip 30, while shown conforming generally to the shape of the depression 44 formed in the pot section 12, extends beyond the circle of revolution of the pot, i.e. radius of the lowermost edge of the upper pot section so as to minimize spillage.

The shape or even the recessed depression 44 is not critical and may even be dispensed with should the shape of the pot section be substantially narrowed at its bottom so that access to the protruding lip 30 is clear. While the shape of the protruding lip or funnel is like an inverted bird's beak, this too is not critical and it can take any protruding shape.

Similarly, the Y shaped footing, while advantageous in providing good stability and seating because of its tri-form, could be replaced by other shapes. A circular foot, a foot of plural bars or even a rectilinear foot may be used.

Various modifications and changes have been disclosed herein, and others will be apparent to those skilled in this art. Therefore, it is to be understood that the present disclosure is by way of illustrating and not limiting of the present invention.

I claim:

1. A flower pot comprising an upper pot section for holding a plant and its roots and a base section secured to the bottom of said upper pot section defining a reservoir for holding a quantity of water, said upper pot section having means for housing at least a portion of the plant root and a hollow pedestal retaining at least a portion of the plant roots within the base section said pedestal being in the shape of a Y, each leg of which has a bottom adapted to rest on the bottom wall of said base container having an opening through which said water can seep into said plant roots, said base section having means extending outwardly therefrom beyond the dimension of the upper pot section for facilitating the passage of water into said base section to fill said reservoir.

2. The flower pot according to claim 1, wherein said legs of said pedestal and the bottom wall are formed with cooperating means for securing said upper pot section and said base section together with the bottom wall of said pedestal spaced from the bottom wall of said base section.

3. The flower pot according to claim 1, wherein said means for securing said upper pot section and said base section together comprise a crucible opening in each leg of said pedestal and a corresponding post extending upwardly from the bottom wall of said base section into locking engagement with said crucible opening, said crucible opening providing communication between the interior of said pedestal and the reservoir.

4. The flower pot according to claim 1, wherein the bottom wall of said upper pot section is provided with at least one opening permitting water to drain from said pot section into said base section.

5. A flower pot comprising an upper pot section comprising a side wall closed at its bottom for housing a floral arrangement and a pan shape base section having a side wall and a bottom wall providing a reservoir for the retention of water, said upper pot section having a hollow pedestal for retaining at least a portion of the roots of the floral arrangement and extending integrally from said upper pot section downwardly into said base section and having at least one opening communicating with the reservoir of water, means for securing said pedestal to said bottom wall of said base section to permit flow of water from the reservoir into said pedestal, the side wall of said upper pot section having an inwardly directed recess and the side wall of said base section having a lip extending outwardly beyond the extent of said upper pot section aligned with said recess in the wall of the upper pot section cooperating to form a pathway for the introduction of water into said reservoir.

6. The flower pot according to claim 5, including means for removably securing said upper pot section and said base section together, said means being arranged so that the lip and recess in the respective walls are unidirectionally aligned.

7. A flower pot comprising:

a base container section having an open top, a first closed side wall and a first bottom wall which define a reservoir to receive liquid, said base container section defining the fluid capacity of the reservoir;

said first closed side wall having an upper edge;

said bottom wall having an upper surface and a lower surface; said upper surface having a plurality of low laying supports;

an upper container section formed to fit into said base container section;

said upper container section having an open top, a second closed side wall and a slotted bottom wall;

said slotted bottom wall having a downward protruding reservoir whereas said downward protruding reservoir extends below the upper edge of said first closed side wall;

said downward protruding reservoir having a third side wall and a second bottom wall, said second bottom wall having a plurality of holes whereas liquid deposited in said bottom container section to enter up into said downward protruding reservoir;

said second bottom wall having a surface area less than the surface area of said slotted bottom wall;

said low laying supports protruding upward to support said downward protruding reservoir at a minimal height above said upper surface of said first bottom wall;

said base container section having a protruding lip extending outward from said first side wall;

said lip having an upper edge even with said upper edge of said first closed side wall, a plurality of pegs protruding upward from said upper surface of said first bottom wall section, said pegs extending upward at a greater height than said low laying supports;

said downward protruding reservoir having a plurality of cross cuts designed and positioned such that said cross cuts fit over and securely around corresponding said pegs, said cross cuts designed to allow fluid deposited in said base container section to enter up into said downward protruding reservoir;

said plurality of pegs and corresponding plurality of cross cuts having set determined positions.

8. The flower pot according to claim 7, wherein said upper container section comprises:

an outer edge of said slotted bottom;

a lower edge of said second closed wall whereas said outer edge meets with said lower edge;

said upper container section having a concave depression extending inward from the outer edge of said slotted bottom wall and upward from the lower edge of the second closed side wall whereas when said upper container section is mated with said base container section said concave depression aligns with said protruding lip.

* * * * *